(12) United States Patent
Weekers et al.

(10) Patent No.: US 8,826,719 B2
(45) Date of Patent: Sep. 9, 2014

(54) MACHINE CALIBRATION ARTIFACT

(75) Inventors: Wilhelmus Weekers, East Greenwich, RI (US); John Langlais, Coventry, RI (US); David Harvey, West Greenwich, RI (US); Peter Hicks, Wyoming, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 0 days.

(21) Appl. No.: 13/325,984

(22) Filed: Dec. 14, 2011

(65) Prior Publication Data

US 2012/0151988 A1 Jun. 21, 2012

Related U.S. Application Data

(60) Provisional application No. 61/423,764, filed on Dec. 16, 2010.

(51) Int. Cl.
*G01B 1/00* (2006.01)
*G01B 3/30* (2006.01)
*G01B 21/04* (2006.01)

(52) U.S. Cl.
CPC .. *G01B 3/30* (2013.01); *G01B 1/00* (2013.01); *G01B 21/042* (2013.01)
USPC ................................. 73/1.81; 33/567; 73/1.79

(58) Field of Classification Search
USPC .............. 73/1.79, 1.81; 33/502, 567
See application file for complete search history.

(56) References Cited

U.S. PATENT DOCUMENTS

| | | | |
|---|---|---|---|
| 1,521,367 A * | 12/1924 | Hahnemann | 33/567 |
| 3,184,856 A * | 5/1965 | Theucrkauf et al. | 33/701 |
| 3,908,278 A * | 9/1975 | Sundahl | 33/502 |
| 4,445,276 A | 5/1984 | Voneky et al. | |
| 5,109,609 A | 5/1992 | Anderson | |
| 5,208,995 A * | 5/1993 | McKendrick | 33/567 |
| 5,313,410 A | 5/1994 | Watts | |
| 5,329,703 A * | 7/1994 | Craig | 33/567 |
| 5,400,638 A * | 3/1995 | Kim | 73/1.79 |

(Continued)

FOREIGN PATENT DOCUMENTS

CN 201011082 Y 1/2008
DE 3538551 C1 10/1986

(Continued)

OTHER PUBLICATIONS

High Accuracy Check Master Series 515, Mitutoyo Corporation, XP002670511, p. 295, Jan. 1, 1999.

(Continued)

*Primary Examiner* — Hezron E Williams
*Assistant Examiner* — Alexander Mercado
(74) *Attorney, Agent, or Firm* — Wolf, Greenfield & Sacks, P.C.

(57) ABSTRACT

A calibration artifact includes an elongated body made substantially entirely of ceramic material and having a direction of elongation. A plurality of measurement elements comprising the ceramic material are integrally formed with the elongated body, each measurement element comprising a first planar measurement surface facing in a first direction. The first planar measurement surface of each measurement element is parallel to the first planar measurement surface of each of the other measurement elements of the plurality of measurement elements. The calibration artifact may be a unitary step gauge formed with a single piece of ceramic material.

20 Claims, 5 Drawing Sheets

(56) References Cited

U.S. PATENT DOCUMENTS

| | | | |
|---|---|---|---|
| 5,671,541 A * | 9/1997 | Dai et al. | 33/502 |
| 5,832,416 A | 11/1998 | Anderson | |
| 6,493,956 B1 * | 12/2002 | Matsuda | 33/502 |
| 6,493,957 B1 * | 12/2002 | Takatsuji et al. | 33/502 |
| 6,822,748 B2 * | 11/2004 | Johnston et al. | 356/608 |
| 6,915,565 B2 | 7/2005 | Isogai et al. | |
| 7,131,207 B2 * | 11/2006 | McFarland | 33/503 |
| 2004/0036867 A1 | 2/2004 | Jedamzik et al. | |
| 2009/0094847 A1 * | 4/2009 | Clifford | 33/502 |

FOREIGN PATENT DOCUMENTS

| | | | | |
|---|---|---|---|---|
| DE | 20 2004 007 653 U1 | 11/2004 | | |
| DE | 20 2007 002 917 U1 | 8/2007 | | |
| JP | 63037201 A * | 2/1988 | | G01B 3/32 |
| JP | 7128002 A | 5/1995 | | |
| WO | WO 2004/040231 A2 | 5/2004 | | |

OTHER PUBLICATIONS

Kolb & Baumann GmbH & Co. KG, "Koba-step the Original," URL: http://www.koba.de/images/stories/koba-step.pdf, Jan. 1, 2009.

\* cited by examiner

MACHINE CALIBRATION ARTIFACT

RELATED APPLICATIONS

This Application claims priority under 35 U.S.C. §119(e) to U.S. Provisional Application Ser. No. 61/423,764, entitled "MACHINE CALIBRATION ARTIFACT" filed on Dec. 16, 2010, which is herein incorporated by reference in its entirety.

FIELD OF INVENTION

This invention relates generally to coordinate measuring machines, and more specifically to apparatuses and methods for calibrating and validating such machines.

DESCRIPTION OF THE RELATED ART

Coordinate measuring machines (CMM's) are in common use for dimensional inspection of workpieces. Typically, a workpiece is secured to a table, and a probe, such as one using a touch sensor, is moved in three dimensions on an arm of the CMM within a measurement volume to contact the workpiece at various points. When the probe contacts the workpiece, measuring scales in the x, y and z directions are read to obtain the position coordinates of the contacted point on the workpiece. By contacting various points on the workpiece, measurements of workpiece features can be obtained.

A CMM is calibrated prior to use so that it can accurately measure the coordinates of locations on the workpiece. Even though CMM's are manufactured to exacting tolerances, errors in the machine arise because of scale errors, slight deformations of the guideways, and other imperfections. Calibration of a CMM can be used to create an error map which can be incorporated within CMM operation software to account for machine errors, thereby improving machine accuracy.

Even after the CMM has been calibrated, the accuracy of the CMM should be periodically verified. CMM accuracy may degrade gradually as a result of aging, temperature variation, or other reasons. In some cases, CMM accuracy may abruptly change due to improper treatment. Various accuracy verification artifacts, such as step gauges, are used to periodically verify the accuracy of coordinate measurement machines. In general terms, the accuracy of a CMM is verified by measuring an artifact having precisely known and constant dimensions. Dimensions of the artifact, as measured by the CMM, are compared with the known dimensions, and any discrepancies between the known dimensions and the measured dimensions are assumed to be the result of inaccuracies in the CMM or its use. Such inaccuracies may be corrected by recalibrating the coordinate measuring machine. When the measured dimensions are within acceptable limits of the known dimensions, the accuracy of the CMM is considered to be verified.

A step gauge is one type of artifact which is used in mechanical tests to calibrate and/or verify the accuracy of a CMM. A step gauge includes parallel measurement surfaces ("steps") having known distances therebetween. When the step gauge is used to verify the accuracy of a CMM, the probe measures the distances between the surfaces.

SUMMARY

According to one embodiment, a calibration artifact includes an elongated body comprising a ceramic material and having a direction of elongation. The calibration artifact also includes a plurality of measurement elements comprising the ceramic material and integrally formed with the elongated body, with each measurement element comprising at least a first planar measurement surface facing in a first direction. The first planar measurement surface of each measurement element is parallel to the first planar measurement surface of each of the other measurement elements of the plurality of measurement elements.

According to another embodiment, a calibration artifact includes a unitary, elongated body formed substantially entirely of a ceramic material and having a direction of elongation, the unitary body including a plurality of measurement elements. Each measurement element includes a first planar measurement surface facing in a first direction. The first planar measurement surface of each measurement element is parallel to the first planar measurement surface of each of the other measurement elements of the plurality of measurement elements.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to one aspect of the invention, a unitary calibration artifact, such as a step gauge, is formed of a single ceramic block. The step gauge includes a plurality of parallel, substantially planar measurement surfaces for use in calibrating and/or validating a CMM. By providing a unitary calibration artifact, variations of the relative distances and orientations of the measurement surfaces due to various factors, including environmental, manufacturing imperfections and damage during use or transport, may be reduced as compared to artifacts formed with removably joined components or multiple materials. For example, the effects of temperature changes, external forces on the artifact, and/or the artifact's own weight on the consistency and integrity of the artifact's measurement surfaces can be reduced in a unitary artifact. By using a ceramic material, low thermal expansion of the artifact may be achieved. Additionally, ceramic materials have a high strength-to-weight ratio, which helps to reduce further sag and other deformations in the artifact caused by the artifact's own weight. Corrosion resistance, humidity resistance and a high stiffness are further potentially beneficial properties which ceramic materials posses for use as a calibration artifact material.

Some known step gages include ceramic probing lugs which are mounted to a steel body. Because ceramics and steel have different coefficients of thermal expansion, errors can result when the step gauge is used at temperature different from the initial reference temperature at which the step gauge was calibrated. For example, when measuring the distance between two sides of a single probing lug, the coefficient of thermal expansion of the ceramic probing lug will dominate thermal expansion errors. Conversely, when measuring the distance between two probing lugs which are spaced far apart on the steel body, the coefficient of thermal expansion of the steel body will dominate thermal expansion errors. As mentioned above, typical CMM software adjusts for thermal expansion, however, typically only a single value for a gauge's coefficient of thermal expansion is permitted to be input to the software. Accordingly, having different coefficients of thermal expansion for different parts of the calibration artifact can create significant errors.

Figure 1:
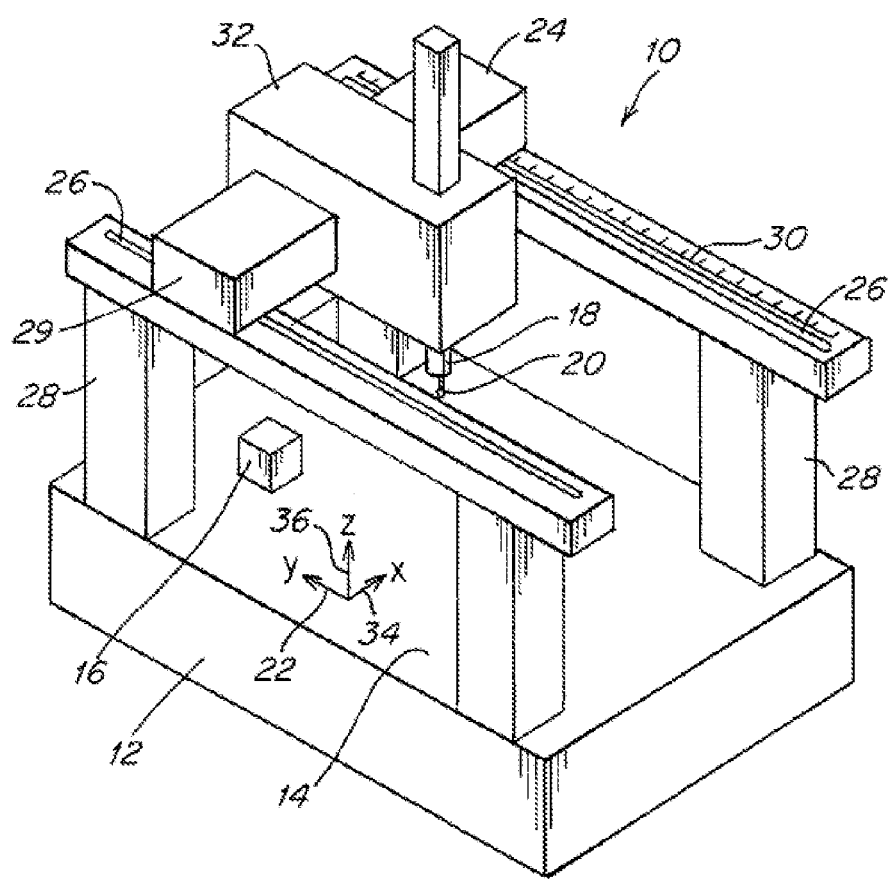
FIG. 1 is a perspective view of one example of a prior art CMM.

One embodiment of a conventional bridge-type CMM 10 is illustrated in FIG. 1. CMM 10 includes a base 12, a table 14 to which a workpiece 16 is secured, an arm 18, and a probe assembly 20 mounted to the arm for sensing and signaling contact with the workpiece. The probe assembly 20 is movable throughout a measurement volume along three orthogonal axes x, y and z. For movement along y-axis 22, a bridge 24 is movably supported by two guideways 26. The guideways may be supported on a base 12 by legs 28. One or both of the guideways 26 include scales 30 from which readings are taken to establish the position of the corresponding end of the bridge. The bridge supports a carriage 32 which moves in a direction along x-axis 34, which is perpendicular to y-axis 22. Mounted to carriage 32 is an arm 18, often referred to as a Z-ram or a vertical ram, which moves along z-axis 36 and carries the probe assembly 20.

Figure 2:
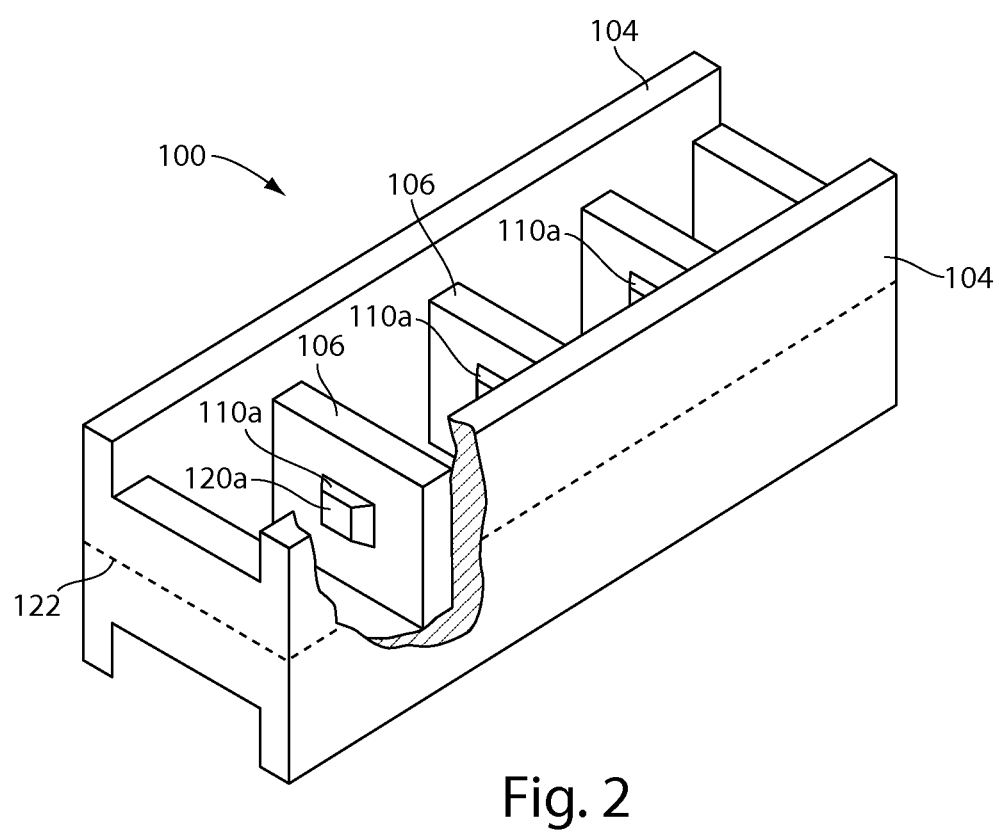
FIG. 2 is a perspective, partially cutaway view of a calibration artifact according to one embodiment of the invention.

One embodiment of a unitary calibration artifact 100 is shown in FIG. 2. The artifact is made substantially entirely of a ceramic material, such as silicon carbide ceramic, and is formed in the shape of an elongated body. A short calibration artifact is shown in FIG. 2 for ease of illustration, though in some embodiments the calibration artifact may have an overall length of one meter or greater, or any other suitable length.

Artifact 100 includes two elongated frame pieces 104 that extend parallel to one another in a direction of elongation of the elongated body. Support cross pieces 106 extend from one elongated frame piece 104 to the other elongated frame piece 104. Support cross pieces 106 may provide structural stability to the artifact, and also provide a support for measurement elements 110a. Measurement elements 110a may extend from support cross pieces 106 in a direction generally parallel to the direction of elongation of the elongated body. Measurement elements 110a each have a face at an end which includes a planar measurement surface 120a.

The planar measurement surfaces 120a of the artifact provide surfaces which a CMM probe may detect to test the accuracy of the CMM's measurement of the distances between measurement surfaces. The planar measurement surfaces 120a (or at least portions thereof) are parallel to one another with a high degree of accuracy as part of providing a consistent basis for distance measurements. Poor parallelism may result in inaccurate distance measurements if different particular points on a measurement surface are contacted by a touch sensor.

Figure 3:
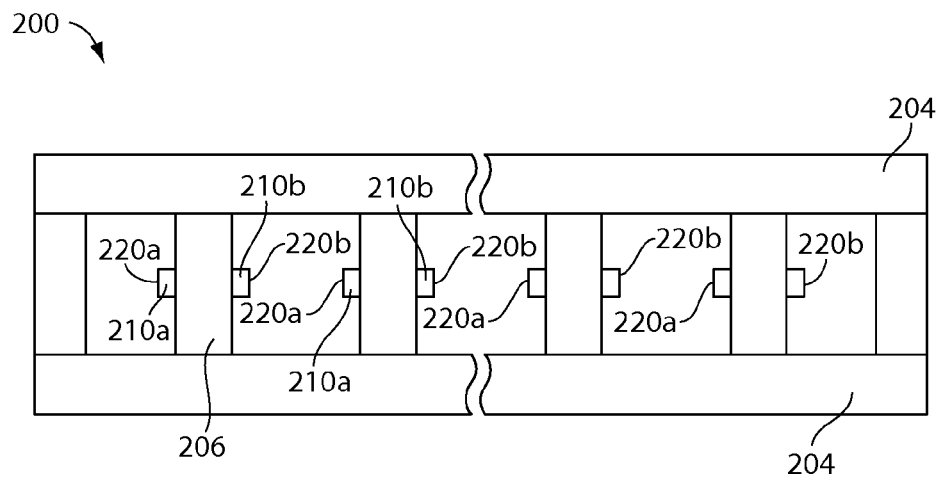
FIG. 3 is a top view of a calibration artifact according to another embodiment of the invention.

A similar measurement element (not shown in FIG. 2) may be positioned on the opposite sides of each support cross piece 106, and may include a measurement surface which faces in a direction opposite of measurement surface 120a. For example, as illustrated in FIG. 3, planar measurement surfaces 220a face in a first direction, and planar measurement surfaces 220b may face in a second direction opposite of the first direction. By providing measurement surfaces which face in opposite directions, bi-directional measurements can be made as part of compliance with International Standards Organization (ISO) standards for CMM acceptance and verification. Bi-directional measurements are measurements of distance where a first surface is contacted by a touch probe which is moving in a first direction, and a second surface is contacted with the touch probe moving in a second direction that is opposite of the first direction.

In embodiments disclosed herein, the measurement surfaces may be spaced at any suitable distance from one another, though generally the measurement surfaces facing in a given direction are approximately equally spaced. For example, in the step gauge embodiment shown in FIG. 3 via a top view, each measurement surface 220a that faces in the first direction is spaced about 40 mm from its closest measurement surfaces 220a. Similarly, each measurement surface 220b is spaced approximately 40 mm from its closest measurement surfaces 220b. In some embodiments, adjacent measurement surfaces that face in opposite directions may be spaced at distances which are one half of the distances between adjacent measurement surfaces that face in the same direction. For example, in the embodiment of FIG. 3, the distance between a measurement surface 220a and the closest measurement surfaces 220b may be about 20 mm. Of course, other suitable distances between measurement surfaces may be used in various embodiments.

For each of the embodiments disclosed herein, the actual distance between adjacent measurement surfaces does not need to be manufactured to an extremely tight tolerance. As long as the distances between adjacent measurement surfaces are manufactured to be within a reasonable tolerance, for example within 100 microns in some embodiments, the actual distances may be determined with a high-accuracy certification CMM during a gage calibration process, and the results may be recorded on the gage calibration certificate. Calibration is typically performed by a National Metrology Institute (NMI) which can provide traceability to the length standard. Typically, a high-accuracy certification CMM uses a touch probe to generally locate measurement surfaces, and then the high-accuracy CMM uses a laser interferometer to measure the distances between the measurement surfaces. For example, contact of a touch probe to a measurement surface may trigger the laser interferometer to perform a measurement. Once the actual distances between the measurement surfaces on the calibration artifact are determined, these distances may be used in acceptance and verification tests as the known distances of the calibration artifact for a period of time. Subsequent verifications of the calibration artifact can be performed after certain time periods or after a certain number of uses.

In some embodiments, such as the embodiment shown in FIG. 2, the planar measurement surfaces 120a are positioned such that a neutral bending axis 122 of the calibration artifact intersects each of the measurement surfaces. In some embodiments, the neutral bending axis intersects each surface 120a at substantially the same relative location on each surface 120a. Intended measurement points at or near the neutral bending axis reduce errors due to changes in the distances between measurement points on each surface 120a due to sag or other bending deformities as compared with measurement points which are spaced from the neutral bending axis. For purposes herein, the neutral bending axis of an elongated calibration artifact is considered to be a cross section of the artifact which does not experience measurable longitudinal strains during bending.

Some embodiments of the calibration artifact may be used with contact or touch probes. Other embodiments may be used with non-contact probes. For example, while planar measurement surfaces 120a may be contact surfaces which are contacted by a touch probe, in some embodiments the measurement surfaces 120a may be used with a laser scanner or other suitable non-contact probes for initial artifact calibration, or for calibration and/or verification of a machine such as a non-contact CMM.

In the embodiment shown in FIG. 3, support cross pieces 206 each have a thickness of about 12 mm and each measurement element 210a, 210b extends outwardly by about 4 mm from a surface of its respective cross piece. Other suitable cross piece thicknesses and measurement element extension lengths may be used in some embodiments. For example, cross pieces 206 may have a thickness of about 7 mm with measurement elements extending about 6.5 mm from the cross pieces. In some embodiments, about 5 mm measurement elements may extend from about 10 mm thick cross pieces.

Figure 4:
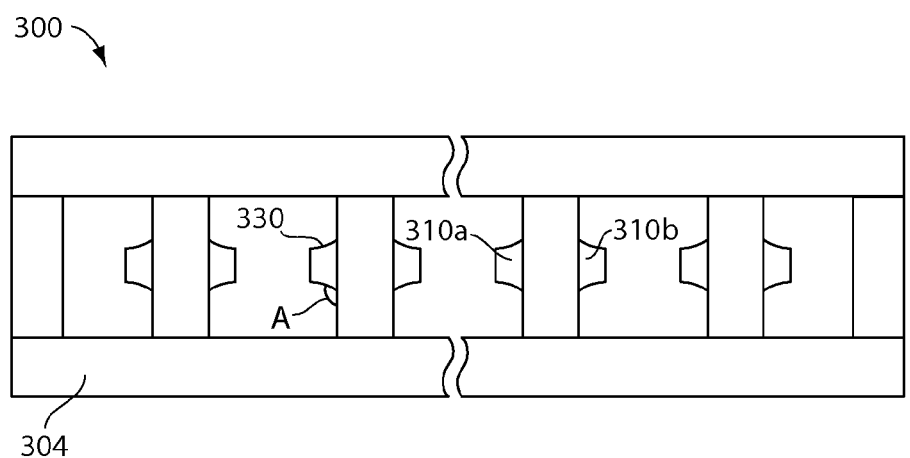
FIG. 4 is a top view of a calibration artifact according to yet another embodiment of the invention.

FIG. 4 shows an alternative embodiment of a calibration artifact 300 in which measurement elements 310a, 310b have a substantially trapezoidal cross-sectional shape in that sidewalls 330 of the measurement elements form an obtuse angle A with respect to surfaces of support cross pieces 306. Angled sidewalls may facilitate removal of the artifact from a mold during manufacture. Measurement elements 310a, 310b may have curved, slightly concave sidewalls 330 as shown in FIG. 4, for example. In other embodiments, sidewalls 330 may be straight, or have both a curved portion and a straight portion.

It should be noted that a support cross piece is not necessarily needed to provide structural stability to the calibration artifact. In some embodiments, one or more support cross pieces may extend from one elongated frame piece toward the opposing elongated frame piece, but be spaced therefrom.

Figure 5:
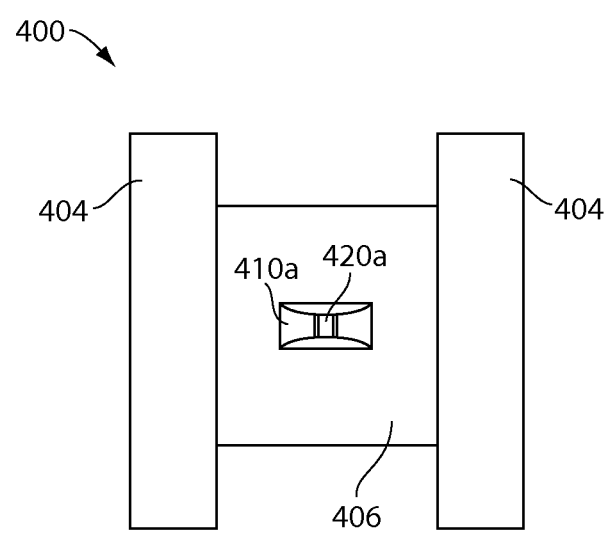
FIG. 5 is a front view of a calibration artifact according to another, further embodiment of the invention.

A front view of a measurement element 410a formed on a cross piece 406 is shown in FIG. 5. A planar measurement surface 420a may be created by machining measurement element 410a of the molded ceramic piece to have a flat surface. For example, an end of each measurement element 410a may be finished with a jet grinding process that creates a planar surface with a high degree of flatness. In some embodiments, any point on the entire planar measurement surface may be used as a measurement point for a probe, while in other embodiments a specific "accuracy" contact zone (e.g., a subset of the planar measurement surface) may be established.

Figure 6:
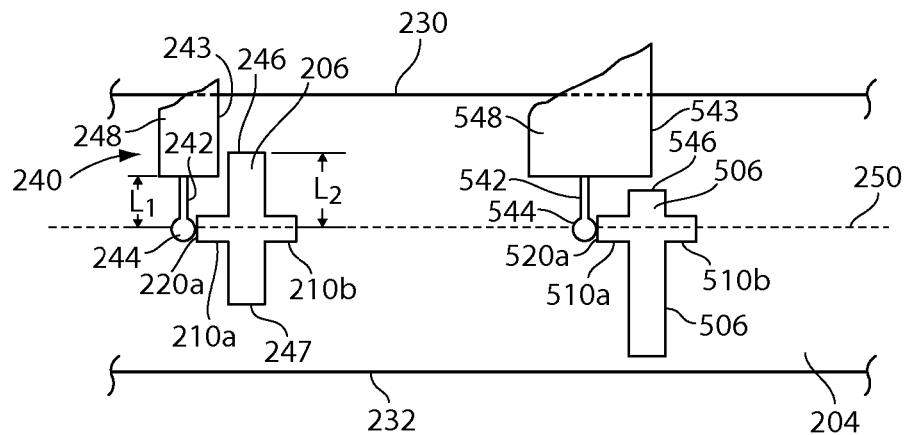
FIG. 6 is a side view of a calibration artifact with one elongated frame piece removed for illustrative purposes.

In some embodiments, the planar measurement surfaces formed on a measurement element of a support cross piece may be centered relative to the cross-piece and/or centered relative to the elongated body in a top-to-bottom direction. For example, as shown on the left side of FIG. 6, support cross piece 206 is centered relative to a top surface 230 and a bottom surface 232 of elongated frame piece 204 in a top-to-bottom direction of frame piece 204. Measurement elements 210a, 210b are centered relative to a top surface 246 and a bottom surface 247 of support cross piece 206 in a top-to-bottom direction of support cross piece 206. In the embodiment shown in FIG. 6, the elongated frame piece 204 has a direction of elongation which is parallel to a longitudinal axis 250, and a top-to-bottom direction extends from an open side of the of the elongated frame piece 204 toward an opposite side of the elongated frame piece 204 in a direction which is perpendicular to the direction of elongation. A top-to-bottom direction of support cross piece 206 may be parallel to the top-to-bottom direction of elongated frame piece 204 and extends from top surface 246 to bottom surface 247 in a direction which is perpendicular to the direction of elongation of the elongated body. It should be noted that the terms "top" and "bottom" do not necessarily require that a top surface is always maintained above a bottom surface relative to ground and/or a machine surface. During use, a calibration artifact may be positioned in any one of a number of orientations, and the top surface may be located below or to the side of the bottom surface (relative to ground and/or a machine surface) depending on the artifact orientation.

For a probe assembly 240 having a combined stylus 242 and touch sensor 244 length $L_1$ which is shorter than a distance $L_2$ from top surface 246 of the support cross piece to the measurement area of planar measurement surface 220a, a probe head 248 typically may have a distance from stylus 242 to an edge 243 which is less than the length of measurement element 210a, so that edge 243 of probe head 248 and cross piece 206 do not contact one another when moving touch sensor 244 into contact with measurement surface 220a.

For handling probe heads which have a distance from stylus 542 to an edge 543 that is larger than the length of the measurement element 510a from the cross piece 506, in some embodiments cross piece 506 may be offset from the center of elongated frame pieces 204. For example, as shown on the right side of FIG. 6, support cross piece 506 is positioned toward the bottom of calibration artifact 200 while measurement elements 510a, 510b remain centered relative to elongated frame pieces 204. As such, the distance from a top 546 of support cross piece 506 to the measurement area of planar measurement surface 520a is reduced, thereby allowing a touch sensor 544 to reach measurement surface 520a even though its probe head 548 has a larger distance from stylus 542 to edge 543 than the distance of measuring surface 520 from cross piece 506.

Cross pieces of varying positions may be included on the same calibration artifact, for example, subsequent cross pieces may alternate with regard to their positions. In some embodiments, all of the cross pieces are situated at the same position. Additionally, in other embodiments the measurement elements need not necessarily be centered relative to elongated frame pieces 204. For example, in some embodiments the measurement elements may be positioned toward a top surface of the calibration artifact, which may permit easier probe access and/or facilitate manufacturing.

Figure 7:
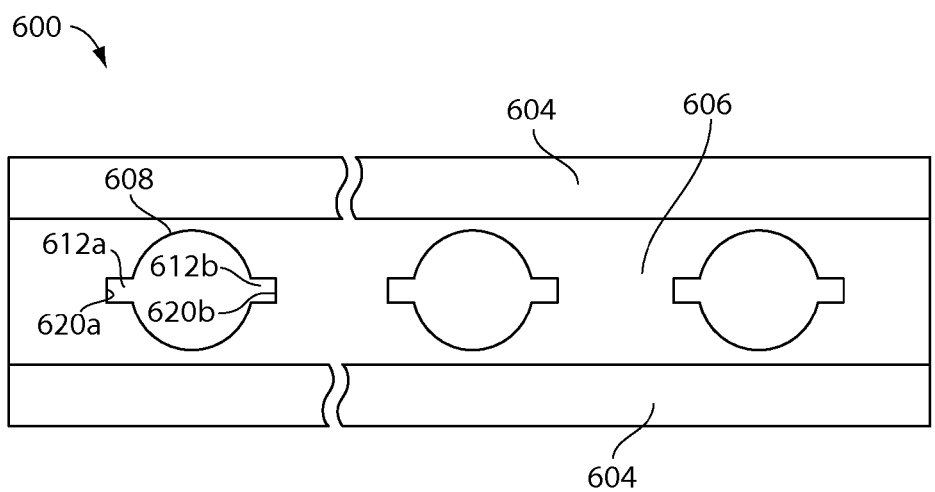
FIG. 7 is a top view of yet another, further embodiment of a calibration artifact of the invention.

Measurement surfaces may be formed in recesses rather than as faces of a protrusion in some embodiments. For example, as shown in FIG. 7, a unitary calibration artifact 600 is formed of a ceramic material. A support cross piece 606 extends the length of the artifact and spans two longitudinal frame pieces 604. Holes 608 may be formed as part of the casting process. Recesses such as grooves 612a, 612b may be machined into opposed sides of each hole 608 with any suitable manufacturing process, thereby forming planar measurement surfaces 620a, 620b. Instead of recesses, in some embodiments measurement elements which are in the form of protrusions may extend from the perimeters of holes 608.

A calibration artifact may be used for calibrating a CMM and/or verifying aspects of a CMM after a period of use. For example, a calibration artifact may be used exclusively to verify a CMM which was calibrated using a different calibration artifact. Or, in some embodiments, a single calibration artifact may be used to both calibrate and verify a CMM.

Ceramic materials have a low coefficient of thermal expansion which can be advantageous when using a calibration artifact at a temperature which differs from the reference temperature at which the calibration artifact was initially calibrated. While many CMMs account for such a temperature difference by applying a correction based on the measured temperature and the reference temperature, errors in the temperature measurement may cause errors which are proportional to the coefficient of thermal expansion value. Accordingly, ceramic materials having a low coefficient of thermal expansion, for example between 2.2 and 4.6 ppm/° K inclusive, may be used in some embodiments. Ceramic materials having coefficients of thermal expansion outside of this range may be used to form calibration artifacts disclosed herein, and materials other than ceramic also may be used in some embodiments.

One embodiment of a method of manufacturing a unitary calibration artifact made substantially entirely from a ceramic material will be described. First, a mold having a mold cavity of suitable dimensions is prepared. Ceramic material and a molten binder are added to the mold. Once the material cools, the piece (often referred to as a "green piece") is removed from the mold, and the green piece is fired to sinter the piece. Measurement surfaces are then machined on the fired ceramic piece. For example, a jet grinding machine may be used to grind end faces of measurement extensions into planar measurement surfaces. Of course, other manufacturing methods may be used to create the calibration artifacts disclosed herein. In some embodiments, a recess may be created in a measurement extension or support cross piece, in which the recess includes a planar measurement surface.

One embodiment of a method of initially calibrating a calibration artifact such as a step gauge with a high-accuracy CMM includes the following acts. First, acts are performed to define a line of measurement (often referred to as a centerline) along which the measurement surfaces will be measured. To define this line of measurement, a first act includes measuring at least three alignment points on the top surface of the step gauge to establish a top plane. Alignment points are then measured on the longitudinal outside face to establish the longitudinal direction of the gauge. Finally, a point is measured on an end face of the calibration artifact. From these measurements, a reference point at a top corner of the calibration artifact is established. The line of measurement is then defined relative to this corner reference point.

With the line of measurement established, the high-accuracy CMM measures the distance of each measurement surface from the corner reference point along the line of measurement to establish the distances of the measurement surfaces from the reference point. Of course, this method is but one example of a calibration method, and other suitable calibration methods may be used.

One embodiment of a method of using a calibration artifact to verify a CMM or other machine includes the following acts. The calibration artifact is held along a first axis of the CMM, for example the x-axis, and distance measurements are taken for five different lengths, for example five different lengths. Each measurement is taken in a bi-directional manner, and the measurements are made three times for each of the five lengths. This procedure is repeated with the calibration artifact positioned along the y-axis, the z-axis, and at least six different diagonal orientations, for a total of at least nine different calibration artifact orientations. The results are compared to the known dimensions of the calibration artifact to determine whether the CMM is in compliance. Of course, other suitable verification methods may be used with embodiments of calibration artifacts disclosed herein, including methods which comply with ISO International Standard 10360-2, "Geometrical product specifications (GPS)—Acceptance and reverification test for coordinate measuring machines (CMM)".

The parallelism of the measurement surfaces of the calibration artifact may be tested by an interferometer test in some embodiments. In other embodiments, a contact probe may be used to check the parallelism of the measurement surfaces by measuring distances along the centerline of the calibration artifact, and then measuring distances along lines that are offset from the centerline by a distance, for example 1 mm. Four lines may be used—one offset upwardly from the centerline, another offset downwardly of the centerline, and two offset to either side of the centerline.

According to a separate aspect of calibration artifacts, a non-unitary calibration artifact may be formed substantially entirely of a single material such as a ceramic material. For example, a unitary, ceramic, elongated body may be formed without measurement surfaces, and ceramic probing lugs may be formed and machined separately. Once the probing lugs are machined to have precision measurement surfaces, the probing lugs may be fused to the elongated body. In some embodiments, ceramic probing lugs first may be fused to a ceramic elongated body, and then jet grinding may be performed to create measurement surfaces on ends of the probing lugs.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A calibration artifact comprising:
an elongated body having a direction of elongation;
a plurality of support pieces configured to support measurement elements, each support piece having a first face disposed substantially parallel to at least one of the others of the first faces, and each first face being transverse to the direction of elongation of the elongated body; and
a plurality of first measurement elements, each first measurement element comprising a first planar measurement surface facing in a first direction, and each first measurement element being supported on a first face of an associated one of the support pieces, wherein each first measurement surface is perpendicular to the direction of elongation of the body.

2. A calibration artifact as in claim 1, further comprising a plurality of second measurement elements, each second measurement element comprising a second planar measurement surface facing in a second direction opposite from the first direction, each second measurement element being supported on a second face of an associated one of the support pieces, each second face being transverse to the direction of elongation of the elongated body, and each second measurement surface being perpendicular to the direction of elongation.

3. A calibration artifact as in claim 2, further comprising a longitudinal axis which intersects each of the first planar measurement surfaces and each of the second planar measurement surfaces at substantially the same relative location on each measurement surface.

4. A calibration artifact as recited in claim 3, wherein the artifact has a neutral bending axis, and the longitudinal axis that intersects each of the first planar measurement surfaces and each of the second planar measurement surfaces at substantially the same relative location on each surface is the neutral bending axis.

5. A calibration artifact as recited in claim 4, wherein each planar measurement surface includes a contact zone, and the neutral bending axis intersects each of the contact zones.

6. A calibration artifact as recited in claim 1, wherein each first measurement element comprises a protrusion which extends from an associated one of the support pieces in a direction which is parallel to the direction of elongation of the elongated body, and each first planar measurement surface comprises an end face of one of the protrusions.

7. A calibration artifact as recited in claim 6, wherein a cross section of the protrusion taken along the direction of elongation of the elongated body has a rectangular shape.

8. A calibration artifact as recited in claim 6, wherein a cross section of the protrusion taken along the direction of elongation of the elongated body has a substantially trapezoidal shape.

9. A calibration artifact as recited in 1, wherein the elongated body comprises first and second elongated frame pieces connected to one another with the support pieces, the support pieces being perpendicular to the elongated frame pieces.

10. A calibration artifact as recited in claim 9, wherein the elongated body has a first open side extending along its length and an opposite second side extending along its length, and the first measurement elements extend from the support pieces approximately halfway between the first open side and the second side.

11. A calibration artifact as recited in claim 9, wherein the elongated body has a first open side extending along its length and an opposite second side extending along its length, and the first measurement elements extend from the support pieces at locations which are closer to the first open side than to the second side.

12. A calibration artifact as recited in claim 1, wherein each first measurement element is integrally supported by its respective support piece, and each support piece is transverse to the direction of elongation of the elongated body.

13. A calibration artifact as recited in claim 12, wherein each first measurement element is integrally formed with its respective support piece, and each support piece is perpendicular to the direction of elongation of the elongated body.

14. A calibration artifact as recited in claim 1, wherein the calibration artifact is a step gauge formed by a single piece of ceramic.

15. A calibration artifact as recited in claim 14, wherein the ceramic material comprises a silicon carbide ceramic.

16. A calibration artifact as in claim 1, wherein each first face is perpendicular to the direction of elongation of the elongated body.

17. A calibration artifact as in claim 1, wherein the first measurement elements are integrally formed with the elongated body.

18. A calibration artifact as recited in claim 1, wherein each first planar measurement surface is recessed with respect to a surface of its respective support piece.

19. A calibration artifact as recited in claim 1, wherein the plurality of first measurement elements comprises at least three measurement elements.

20. A calibration artifact comprising:
an elongated body having a direction of elongation and comprising first and second elongated frame pieces;
a plurality of measurement elements integrally molded with the elongated body, the elongated body and measurement elements comprising a ceramic material, each measurement element comprising a first planar measurement surface facing in a first direction; wherein
the first planar measurement surface of each measurement element is parallel to the first planar measurement surface of each of the other measurement elements of the plurality of measurement elements; and
a plurality of cross pieces, each connected to the first and second elongated frame pieces and having a first face transverse to the direction of elongation, wherein each measurement element is supported by the first face of an associated one of the cross pieces.

\* \* \* \* \*